US006452873B1

(12) United States Patent
Holt et al.

(10) Patent No.: US 6,452,873 B1
(45) Date of Patent: Sep. 17, 2002

(54) VISUALLY CHANGING PAPER TIME INDICATOR EMPLOYING CONTROLLABLE BARRIER

(75) Inventors: Robert Holt, Cornwall-On-Hudson; David J. Haas, Suffern, both of NY (US)

(73) Assignee: Temtec, Inc, Suffern, NY (US)

( * ) Notice: Subject to any disclaimer, the term of this patent is extended or adjusted under 35 U.S.C. 154(b) by 9 days.

(21) Appl. No.: 09/593,854

(22) Filed: Jun. 14, 2000

Related U.S. Application Data

(60) Provisional application No. 60/138,790, filed on Jun. 14, 1999.

(51) Int. Cl.[7] ........................ G04B 17/00; G01D 11/00; G01D 21/00

(52) U.S. Cl. ........................ 368/327; 116/200; 116/206

(58) Field of Search ................................ 368/114, 327; 116/200, 207, 217, 300; 422/56–58, 61

(56) References Cited

U.S. PATENT DOCUMENTS

| | | | | | |
|---|---|---|---|---|---|
| 4,903,254 | A | * | 2/1990 | Haas | 368/327 |
| 5,053,339 | A | * | 10/1991 | Patel | 436/2 |
| 5,446,705 | A | * | 8/1995 | Haas et al. | 368/327 |
| 5,633,835 | A | * | 5/1997 | Haas et al. | 368/327 |
| 5,633,836 | A | * | 5/1997 | Langer et al. | 368/327 |
| 5,699,326 | A | * | 12/1997 | Haas et al. | 368/327 |
| 5,822,280 | A | * | 10/1998 | Haas | 368/327 |
| 5,930,206 | A | * | 7/1999 | Haas et al. | 368/327 |

* cited by examiner

*Primary Examiner*—Vit Miska
(74) *Attorney, Agent, or Firm*—Michael E. Zall

(57) ABSTRACT

A time indicator rapidly changes color after a specific time interval. The indicator comprises "back part" that includes a base substrate with a colored dye or colorant deposited on a first surface. A colorant impermeable barrier layer overlays the colorant or colored dye. The indicator further comprises a "front part" that includes a substrate having an adhesive on a first surface thereof. When the back part and front part are put into adhesive contact with each other, the parts coact with each other to cause the colorant impermeable barrier layer to change to a colorant permeable layer to permit the dye to migrate through the layers to cause a color change visible through the front part.

18 Claims, 4 Drawing Sheets

VISUALLY CHANGING PAPER TIME INDICATOR EMPLOYING CONTROLLABLE BARRIER

RELATED APPLICATIONS

This application claims the benefit of provisional application U.S. Serial No. 60/138,790 filed Jun. 14, 1999. This application is incorporated herein by reference.

BACKGROUND OF THE INVENTION

1. Field of the Invention

This invention relates to a time indicator for indicating the passage of time by the appearance of, for example, a colored image and/or alphanumeric indicator. The common term for this time indicator technology is visually changing paper.

2. Prior Art

There are several commercially available time indicating systems based on the migration of a colorant or dye. In one system the colorant or dye migrates through an opaque cover or film. In another system the colorant or dye is applied to a surface in a pattern of dots of a migrating dye and a non-migrating dye and a clear film is applied over this pattern of dots. Over a period of time the migrating dye dots enlarge and develop an image which is visible through the clear film. These two technologies are, for example, covered in U.S Pat. Nos. 4,903,254 and 5,058,088, both to Haas. In both these technologies the timing is achieved by the rate of migration of the dye through layer or across a surface of the layer.

U.S. Pat. Nos. 5,633,835 and 5,822,280 to Haas, et al. adds a barrier layer to these technologies. The barrier layer is a dye impermeable layer that over a period of time permits the dye to permeate the barrier and then migrate through an opaque layer or migrate laterally. The dye impermeable layer is caused to become permeable to the dye, typically by the use of a plasticizer. Very few films dissolve with common types plasticizers. This leaves a relatively small selection of plasticizer and dye impermeable layer from which to choose. For example, a large volume of plasticizer may be needed to dissolve a thick film making the system impractical and/or expensive. Further, this system is limited to using colorants that are migrating dyes and with lateral migrating dyes, both a migrating and non-migrating dye are required.

Other related prior art:

U.S. Pat. No. 4,643,122 to Seybold describes a barrier film to control the rate of diffusion/evaporation of a solvent. Upon evaporation of the solvent, the security tag changes color indicating undesirable storage or product tampering.

U.S. Pat. No. 4,042,336 to Larsson describes a gas permeable film for a time-temperature integrating indicator. The indicator consists of a gas generating compartment, a wick and a gas permeable film, separating the two. The gas permeable film helps control the rate of evaporation.

U.S. Pat. No. 4,327,117 to Lenack, et al., utilizes an impermeable but removable or breakable barrier in a thaw indicator for frozen foods. The indicator is attached to a frozen food and when the food thaws, the components in the two segments intermix and/or interact producing a visible chemical and/or physical change. This is not used as a time indicator.

U.S. Pat. No. 4,812,053 to Bhattacharjee describes an oxygen permeable layer and an oxygen barrier used in a time-temperature indicator. The indicator is activated by physically removing the oxygen barrier. The timing is controlled by the rate of oxygen diffusion through the oxygen permeable layer.

U.S. Pat. No. 4,401,721 to Hida describes thermosensitive recording materials that have a heat sensitive layer containing leuco dyes and color formers (example: an acid) that upon heating will come together, react, and form a color. In addition to this heat sensitive layer, a protective overcoat layer may be used. The layer prevents premature or unwanted color formation. These systems change color upon heating and are not used as time indicators.

Color changing indicator agents based on changing pH have been used extensively for many years. Many of these indicators, such as phenolphthalein, have a colored and colorless pH range. Such pH indicators have been used in books, educational materials and games. For example, U.S. Pat. No. 5,215,956 to Kawashima describes a color changing print wherein, areas are printed by with different types of color changing inks that develop into different colors from their substantially invisible colorless state by reaction with a color changing agent. When an acid or base is applied by pen, marker or paintbrush, the color changing inks develop into different colors.

U.S. Pat. No. 5,085,802 to Jalinski describes a time-temperature indicator that uses a pH indicator, i.e., an acid and a base that reacts together at a certain rate and neutralizes each other. One substance is in excess of the other so that after depletion of one component, the pH changes, resulting in a color change.

U.S. Pat. No. 4,810,562 to Okawa, et al. describes a sheet wherein the image thereon changes with the application of water. In this system, an image is hidden by an opaque film. When the film becomes wet, the opaque coating layer becomes transparent revealing the hidden image underneath the opaque coating layer. This patent does not teach or suggest a time indicator unit.

U.S. Pat. No. 4,877,253 to Arenas describes a Bingo game card coated with a microporous coating. When a volatile liquid is applied to the coating that fills the micropores it makes the area to which it is applied transparent, exposing the underlying colored support sheet. This patent does not teach or suggest a time indicator unit.

U.S. Pat. No. 4,629,330 to Nichols describes a color-change indicator having a microporous layer wherein when the micropores are filled with a liquid the opacity of the layer decreases.

U.S. Pat. No. 4,229,813 Lilly, et al. describes a time indicator that does not use a barrier layer to control the timing of the indicator. This patent uses a barrier (frangible ampule) to separate the colored diffusing silicone oil from traveling up a porous strip. This barrier is physically broken by the end user to activate the timing. Timing is based on the rate of the colored oil traveling up the wick.

U.S. Pat. No. 4,163,427 to Cooperman. et al. describes containing a soluble color former micro-encapsulated in a frangible micro-capsule which is used as a freeze-thaw indicator. If the temperature decreases below the freezing point of the water solution, the ice formed causes the rupturing of the micro-capsule. Upon heating, the ice melts allowing the water and color former to flow out and produce a visual color change.

OBJECTS AND SUMMARY OF THE INVENTION

An object of this invention is to provide a non-electronic time indicating device that visually indicates the passage of a predetermined time.

Broadly, the time indicator of this invention rapidly changes color after a specific time interval. The indicator comprises a "back part" that includes a base substrate with a colored dye or colorant deposited on a first surface. A colorant impermeable barrier layer overlays the colorant or colored dye. The indicator further comprises a "front part" that includes a substrate having an adhesive on a first surface thereof. When the back part and front part are put into adhesive contact with each other, the parts coact with each other to cause the colorant impermeable barrier layer to change to a colorant permeable layer to permit the dye to migrate through the layers to cause a color change visible through the front part.

The time indicator of this invention has an impermeable layer that prevents the colorant from appearing. The color signal does not begin to appear until the colorant impermeable barrier layer has changed to a colorant permeable layer. In one embodiment, the indicator has a migration modifier that changes the barrier layer to a permeable layer. After the barrier becomes permeable, a color appearing or color changing mechanism can occur such as, a colorant migrates to a visible layer or a colorant and co-colorant reacts/interacts resulting in a color change.

This invention may contain an opaque layer that conceals the colorant until the barrier is breached or modified.

This invention may also contain a clear front substrate with a colorant (such as a migrating dye/ink) on the back substrate.

The time indicator is supplied in two parts, which is activated by adhering the front part to the back part. The migration modifier can be in either the front or back substrate. The migration modifier changes the barrier from an impermeable layer to a permeable layer. The mechanism for the change can be performed by several methods, as discussed later.

The colorant can be: a migrating dye, a pH indicator, a leuco dye, a dye intermediate, a non-migrating dye, a reactive dye, color changing agent or any color former. The time indicator is a two step process. The first step is the breaching of the barrier layer and the second is the color appearing process.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Clear Technology

Figure 1:
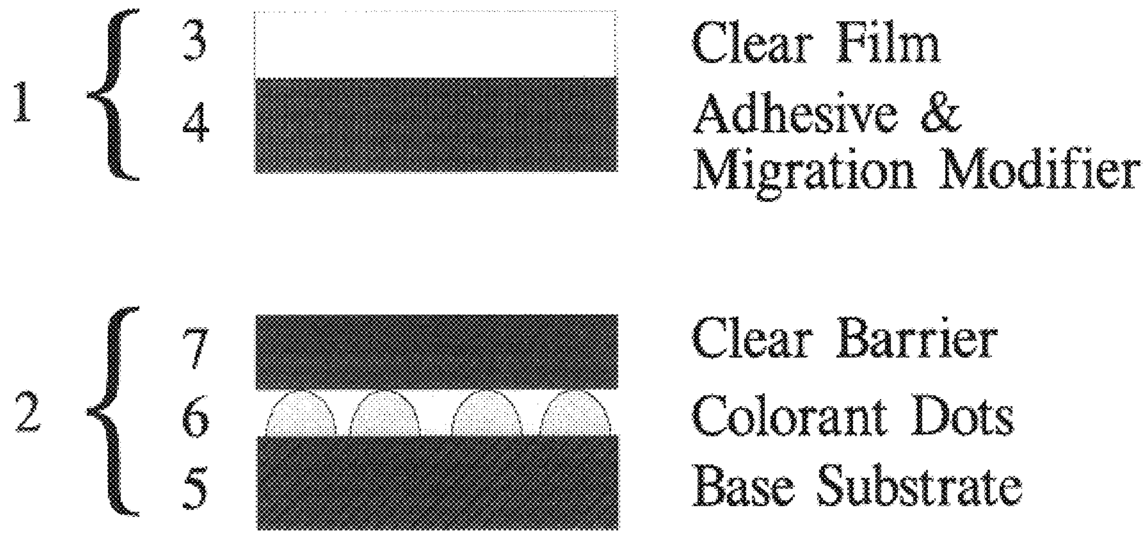
FIG. 1 is a cross-sectional view of the time indicator prior to activation for the clear technology system using a barrier layer.

FIG. 1 is an example of the time indicator of the present invention. It is provided in two parts, the front part (activator) 1 and the back part 2. It is an example of the clear technology using a barrier layer. The front part 1 consists of a clear substrate or transparent sheet 3, such as a polyester or acetate film. Attached to one side of the sheet 3 is a pressure sensitive adhesive layer 4. A migration modifier such as a plasticizer may be dissolved in the pressure sensitive layer 4. The back part 2 consists of a substrate 5 such as paper or plastic film. On one side are migrating and non-migrating colorants (ink/dye) 6 in the form of dots or shapes (mezzogram). Overlying the migrating colorant is the clear colorant impermeable barrier layer 7.

Upon activation, the front part 1 is placed into contact with the face of the back part 2, the adhesive 4 contacting the barrier layer 7. The migration modifier in the adhesive gradually migrates into the barrier layer 7. After a specified time, the barrier layer 7 changes from an impermeable layer to a permeable layer due to the migration modifier.

There are several means for transforming the impermeable barrier layer 7 to an ink/dye permeable layer, e.g., shifts in the glass transition (Tg) of the barrier layer 7, change in phase of the barrier layer 7, creating diffusion channels in the barrier layer 7, breaking intermolecular forces in the barrier layer 7, pH changes in the barrier layer 7, polarity changes in the barrier layer 7, or any other change in property of the barrier layer 7 that changes the permeability of the layer or migration rate. After the change in permeability of the barrier layer, the migrating colorant rapidly migrates laterally to produce a rapid color change.

A preferred example of a clear technolgy barrier timing layer (approximately 20–26 hours to initial readability) comprises the following:

Front Part
- a) a clear PET (polyester) film;
- b) an adhesive containing 15% (wet weight) Plasthall 203 (C.P. Hall) in H&N 213 pressure sensitive adhesive (85%)—1 mil thick dry; and Back Part
- a) Barrier Layer—#20 Meyer rod:
  - 1) 65% (wet weight) JonCryl 77
  - 2) 17.5% (wet weight) JonCryl 89
  - 3) 17.5% (wet weight) JonCryl 61
- b) Migrating Ink Layer
  - 1) Gans Ink & Supply Co. (L.A., Calif.) Pyroscript Black ink (item #57976) & color matching offset ink—printed dot pattern
- c) Substrate—EDP label paper

Opaque Technology

Figure 2:
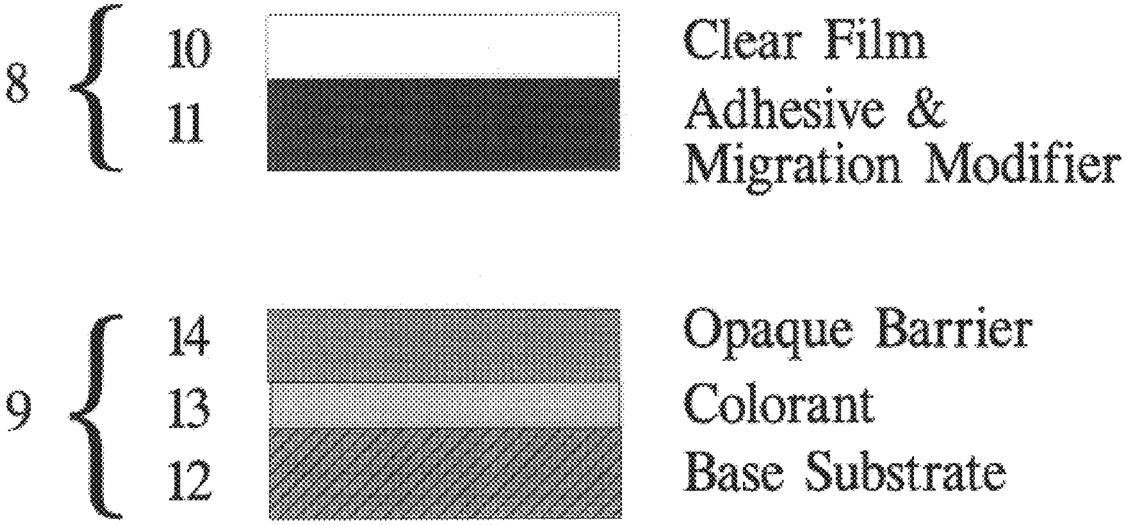
FIG. 2 is a cross-sectional view of the time indicator prior to activation for the opaque technology system using a barrier layer.

Referring to FIG. 2, there are four different embodiments of the opaque technology that have been examined. In all embodiments, either the front part or the back part, or both, are white opaque layers of similar construction to that described for the clear technology. The opaqueness hides or partially hides the message (migrating ink) from being seen until the time has expired. These different embodiments may be described as:

1) clear front part with white opaque back part, 2) white opaque front part with clear back part, 3) white opaque front part with white opaque back part, and 4) white opaque front part with dark or black back part.

FIG. 2 is an example of the opaque time indicator of the present invention. It is constructed in two parts, the front part (activator) 8 and the back part 9. This example uses the opaque barrier layer system, i.e., 1) above. The front part consists of a clear substrate or transparent film 10, such as a polyester or acetate film. A pressure sensitive adhesive layer 11 coats or is attached to one side of film 10. A migration modifier such as a plasticizer may be dissolved or dispersed in the pressure sensitive adhesive layer 11. If desired printing may exist on the other side or front side of film 10 with a white opaque ink to hide portions of the underlying colorant.

The back part 9 consists of a substrate 12 such as paper or plastic film. On one side is a layer of a migrating colorant (ink/dye) 13 within a matrix. Over the migrating colorant is the opaque colorant impermeable barrier layer 14, which may be colored or tinted, but preferably will be white.

Upon activation, the front part 8 is placed into contact with the face of the back part 9, the adhesive 11 contacting the barrier layer 14. The migration modifier in the adhesive gradually migrates into the barrier layer 14. After a specified time, the barrier layer 14 changes from an impermeable layer to a permeable layer due to the migration modifier. After breaching the opaque barrier layer 14, the migrating colorant 13 rapidly migrates through the opaque layer toward the adhesive layer 11 to produce a rapid color change. The adhesive layer 11 acts as an enhancement layer, which enhances the color of the migrating colorant.

A preferred example of an opaque technology barrier timing layer having an expiration time of 6–12 hours, using the opaque barrier layer system, i.e., 2) above, comprises:

Front Part—Opaque a) a PET film—2 mils thick b) an adhesive containing 13.4% (wet weight) Plasthall 203 & 26.9%, Morton 1106V TiO2 in H&N 213 pressure sensitive adhesive (59.7%)—1 mil thick dry Back Part a) Barrier Layer—
  1) 62.4% JonCryl 77
  2) 16.8% JonCryl 89
  3) 16.8% JonCryl 61
  4) 4.0% TiO2 TiPure R-104 b) Migrating Ink Layer
  1) 10% Disperse Red 60 in Gotham Flexographic varnish ink (item #3V821)
  2) Substrate—EDP label paper with pressure sensitive adhesive.

Dark or Black Barrier Layer Benefits in Opaque Technology

Using a dark or black pigment, i.e. 4 above, instead of a white pigment such as TiO2, used above, has many benefits. A dark or black barrier layer with a white opaque front part can improve the optical properties of the device of this invention. For example, with a clear or translucent barrier, the migrating dye can be seen as it initially passes through the barrier. If it is behind a white front part, the color of the migrating dye does not have a large chroma (color intensity). The initial appearance is a grey image (shadow), which gradually intensifies as the dye continues to travel into the upper layers, the white opaque layer and the enhancement layer.

However, a dark or black barrier helps hide the initial image before the migration process begins. The dark or black barrier also hides the initial stages of dye migration through the barrier layer. This is important during the early stages of migration, because the concentration of the dye is low and the color intensity will be low (grey). Additionally, the concentration of migration modifier is also low in the barrier. Without the dark or black barrier layer, during this grey period, interpretation of expiration may be difficult and ambiguous and could vary from person to person as to whether expiration has occurred.

As time passes, the concentration of migration modifier increases in the barrier and the migration rate of dye through the barrier will increase. The change of appearance will then occur more rapidly. This shortens the grey period and improves the ability of an observer to unambiguously determine expiration.

Barrier Change

An important parameter to control in this invention is the time required to change the permeability of the barrier layer. This parameter sets the time for the time indicator. The migration rate changes as the barrier changes from zero (no migration) to some value greater than zero depending on the requirements of the products. After this fundamental step in permeability of the barrier layer, a color change will occur indicating the end of the period.

The barrier layer can be a polymer or polymer matrix composed a single component or several constituents such as polymers, monomers, fillers, pigments, plasticizers, pH buffers, surfactants, anti-oxidants or any other materials that contributes to the overall properties of the layer. The layer can be prepared in many forms such as a film, coating, membrane, micro-encapsulation, or co-mixed in a matrix.

The property that restricts the color change mechanism (barrier change) and then allows the color change process to occur can happen via several mechanisms. The controlling mechanism of the barrier change depends on many variables such as: the migrating materials chosen, the barrier layer components, the migration modifier, and thickness of materials. Examples of the controlling properties are: changes in state (change in glass transition—Tg), phase change (solid to liquid), breaking intermolecular forces (hydrogen bonding, covalent bonding, ionic bonding, π—π interactions, etc.), change in oxidation state (oxidation or reduction), pH change, polarity change (polar to non-polar), co-mixing of materials, migration channel formation (filling of pores), viscosity change, decomposition, or any other property that changes the barrier from impermeable to permeable.

Upon activation of the indicator, a constituent (migration modifier) from one part of the system (example: front part) will migrate to the other part (example: back part) and interacts with the barrier layer. The constituent will change the barrier properties depending on the mechanism chosen. Examples of barrier changing mechanisms are:

1) Plasticizer/organic liquid will diffuse into a polymer barrier layer and lower the barrier glass transition temperature, which allows the migration of a dye through the polymer.

2) Increase temperature will change the permeability properties by changing transition state (glass/elastomer), increase free volume, increasing colorant solubility, and/or increasing diffusion rate of the colorant.

3) A dye-compatible organic liquid. diffuses into a dye-incompatible layer, changing the compatibility of the layer, and allows the dye to migrate through the layer. An example is a polar (non-polar) plasticizer diffuses into non-polar (polar) adhesive (changing the polarity of the adhesive) and allows a polar (non-polar) dye to migrate through the adhesive.

4) Tonically bound dye (such as an acid dye) is released (substituted) when an acid (H+) is introduced/migrates into or through the barrier layer.

5) Acid/base migrates through a barrier layer and effects the local pH around a pH sensitive dye/indicator and changes color.

6) Reducing/oxidizing agent reacts and changes the chemistry of the barrier layer, which allows the migration of a colorant followed by a color change via any of the various color change mechanisms.

7) A plasticizer/organic liquid migrates through a barrier layer changing the barrier permeability and allows a second substance to co-migrate with the plasticizer. The second substance can then follow any color change mechanism to produce a color change.

8) A liquid substance can migrate into micropores (by capillary action) in the barrier layer, creating channels through the barrier allowing components to migrate and have a color change by any of the various methods.

9) An organic liquid will break down the micro-encapsulation of a color anywhere the micro encapsulation is a barrier, after which the colorant can migrate or react by any of the color change mechanisms.

Colorants

The term colorant, as used herein, has a broad meaning in that it is a substance that has color or that can combine with another component and develop a new color. The colorant can be: hydrophilic or hydrophobic dyes, pigments, leuco dyes, dye intermediates, pH indicators, reactive dyes or any color formers.

There are many ways that color can be formed after the breaching of a barrier. These systems involve the migration of a component. After migration of the component, a second component or components will react, interact, or combine to form a color change. Many different color change mechanisms can be used and are known throughout the art. Examples of the color changing mechanisms are: pH indicators, oxidation or reduction of a colorant, substitution reactions, elimination reactions, acid/base reactions, metal ion complexation, photosensitive reaction, decomposition reactions, or any other reaction and interaction known in the art. These mechanisms can involve the use of many different materials and colorants such as: reactive dyes, dye intermediates, leuco dyes, and bound dyes. In the example of a bound dye, the colorant maybe colorless or a different color that is bound in some way (covalent bond, ionic bond, strong intermolecular forces, etc.) to another material such as a polymer chain or the surface of a particle. A second component will migrate to the color and disrupt/break the interaction and release the bound colorant. The released colorant may change color at this point or interact with another component and change color. The released colorant may migrate through an opaque layer or migrate laterally as in the clear technology.

Another way that the color can appear is with the use of an opaque layer that becomes transparent. After the barrier is breached a component can migrate into the opaque layer and change the opacity of the layer.

Migrating Dye and Miration Modifier

Both the clear technology and the opaque technology as discussed herein can be used with a migrating dye. As shown in FIG. 1 and FIG. 2, the migrating dye is within the back part. The barrier layer prevents the migration of the dye/colorant. After adhering the front part to the back, the migration modifier from the front diffuses into the barrier layer. The migration modifier can be a common plasticizer and the barrier layer can be thin film or coating such as poly vinyl chloride. Plasticizers are known to migrate into and out of poly vinyl chloride. One of the differences between plasticizers is their migration rate in poly vinyl chloride and there are a varied of commercially available plasticizers with different migration rates. When a plasticizer migrates into a polymer such as poly vinyl chloride, some of the properties of the layer changes. The plasticizer migrates between the polymer molecules and disrupts the intermolecular forces between the polymer strains. It replaces the polymer-to-polymer bonds with secondary polymer to plasticizer bonds, thus allowing the movement of polymer segments. The result is a more flexible layer. As plasticizer migrates into the layer, the glass transition temperature of the layer decreases. If the glass transition temperature changes from above ambient temperature to near or below ambient temperature, the internal polymer structure moves easily and allows migration of other constituents (dyes). Compatibility (solvation) between the migrating dye and the plasticized polymer needs to be good for migration of the colorant to occur. At a completely plasticized polymer stage, the distribution of the diffusing dye and its change with time are usually governed by Fick's Law. In our case, this may not always be the case since the concentration of the plasticizer in the barrier layer will change (increases) with time and the distribution of plasticizer will differ across the barrier layer as the plasticizer migrates into the barrier. This maybe a benefit, as the concentration of plasticizer increases, the dye concentration and migration rate will increase, yielding a quicker turning indicator. One who is familiar with this art can construct different combinations of the layers to achieve similar results. In the opaque technology, the opaque layer can be in the front part (provided the opaque layer hides the colorant) and the breaching layer can be in the back part. Multiple barrier layers can be use with or without multiple migration modifiers to control the timing.

Examples of migration modifiers are: dibutyl phthalate and dioctyl adipate from C. P. Hall.

A preferred example of a migrating dye is (Disperse Red 60) IntrathermBrilliant Red P-314NT from Crompton & Knowles.

Heat Activated

In the case of temperature-activated migration modifier, no FrontPart is needed (1 or 8). The unit is placed in a heated environment. The impermeable barrier changes into a permeable layer (due to change in $T_g$, increase free volume, and/or increased permeate solubility). This is a similar effect as stated above in the plasticizer migration modifier case. The solubility and diffusion rate of the migrating colorant increases from zero to some value above and allows the colorant to appear at a predetermined time after being placed in a new higher temperature environment.

Examples of a barrier could be the same as used in the above example and not requiring a plasticizer migration modifier, using high temperature for activation instead. The system could be constructed for both clear and opaque systems.

Direct Thermal

Figure 3:
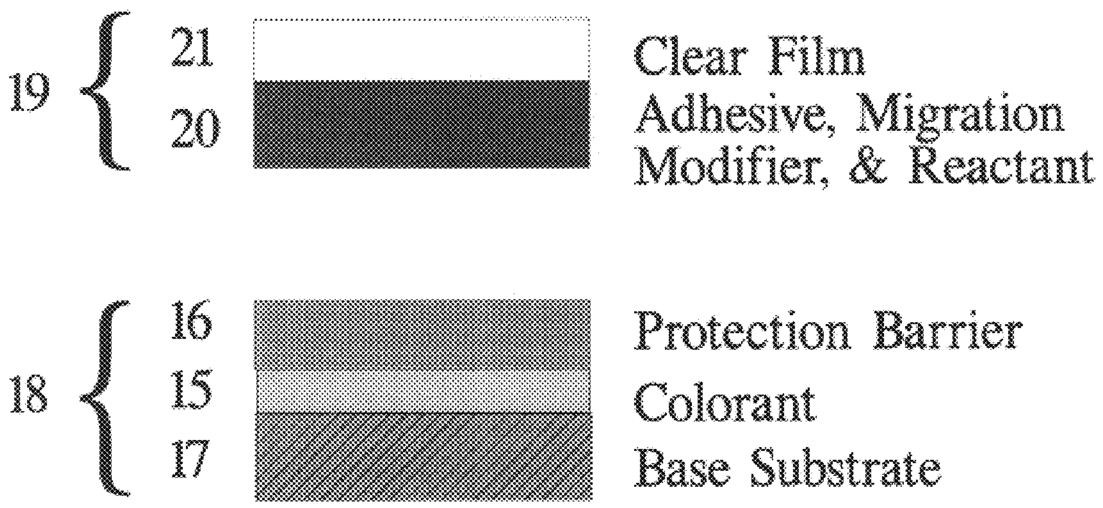
FIG. 3 is a cross-sectional view of the time indicator prior to activation for direct thermal media with a barrier layer and Front Part.

The invention (see FIG. 3) has a similar construction to a direct thermal transfer paper except it has an added activation cover (front part). Readable information will be printed on the back part using a direct thermal printer and the activation cover is attached. After a certain period, the image will change. The readable information can be alphanumeric characters, symbols or bar codes. This construction can have one of two things happen: 1) The printed image will disappear or fade beyond recognition; or 2) The sheet, (or white areas), will darken or turn the same color as the printed information.

The direct thermal paper (back part) is composed of several coatings on a substrate, usually paper. The most common construction is a base material that has two coatings. The first layer 15 is the colorant layer and the top coating is the protective layer 16. Some commercially available direct thermal paper does not have a protective layer, (the colorant layer is also the barrier layer). The colorant layer contains two reactive ingredients, a colorless leuco dye and a reactant/acid. The normal printing process of direct thermal paper requires the paper to be heated where the resultant image will be. The heat allows the dye and acid to flow together and react. The product is a colored substance.

The principle behind this invention is that after an extended period following printing, a subsequent reaction occurs with the leuco dye. Two situations can occur, either the colored dye is converted to a colorless or a different color dye, or the remaining unreacted colorless leuco dye (in the unprinted area around the printed information) is changed to its color form. An example of a leuco dye is Copikem 4 Black, N102-T from Hilton Davis. Leuco dyes can be colorless or pale and when reacted, can be any color, such as magenta, blue, yellow, or black, depending on the dye selected. Any weak or strong base should convert the color dye back to the colorless dye, depending on the dye. Examples of bases are: ammonia, sodium hydroxide, and ethylene diamine. Examples of materials that will convert unreacted colorless dye to the color form are: bisphenol A, and benzyl paraben.

Other inorganic or organic acids can also be used. Plasticizer can be used to control the migration of the afore-described chemicals. Examples of plasticizers are ethylene glycol, and glycerin. A binder is used to contain the reactive materials. The most commonly used binder is poly vinyl alcohol such as Airvol 325 from Air Products and Chemical, Inc., Allentown, Pa. This binder can be used as the protective layer but it usually has additional materials that impart chemical resistance. Upon applying the front part (activator), the migration modifier in the adhesive layer 15 will start to migrate through the protective layer (delay time). After changing the layer, the migration modifier migrates into the colorant layer. The co-reacting agent (acid/base) in the adhesive layer 16 will also migrate with the migration modifier. (Note: The migration modifier (plasticizer) can also act as the co-reactant). When the co-reactant migrates to the (leuco) dye, a color change occurs by either of the two mechanisms.

An example of a commercially available paper is: Kanzaki Label Technologies (Springfield, Mass.) Kanstrip KL270/SP100. A clear front part consisting of 15%(wet weight) Plasthall 7050 plasticizer in H&N 213 pressure sensitive adhesive yields a 1–2 day expiration of a barcode (unscanable), depending on the barcode reader and type of bar code used.

pH Indicator

Figure 4:
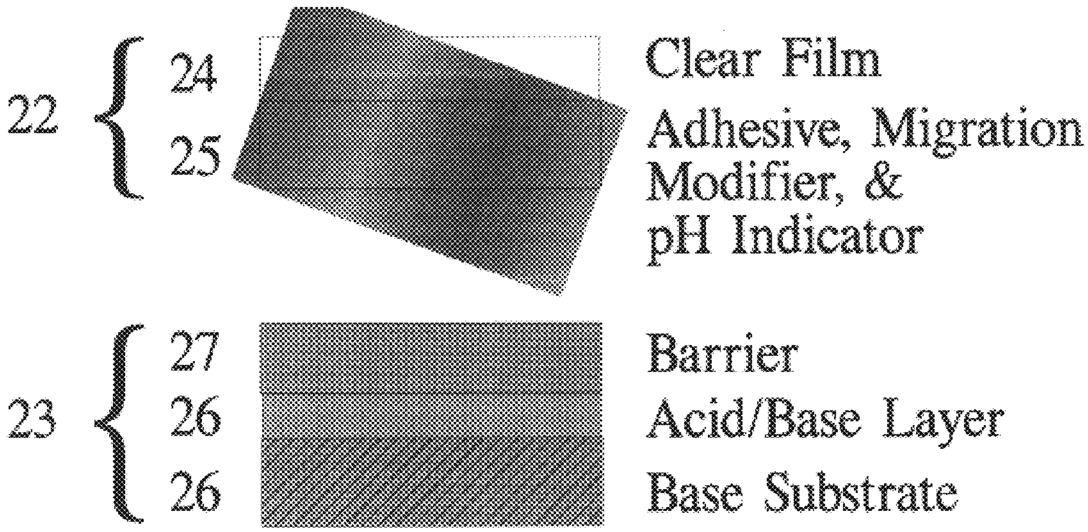
FIG. 4 is a cross-sectional view of the time indicator prior to activation for the pH indicator system using a barrier layer.

FIG. 4 shows a cross section of a time indicator using a pH indicator agent as the colorant. In this example, a migrating acidic component is used to create a color change. A barrier layer is used to create a delay time. An organic liquid (example: ethylene glycol) from the front part will breach the barrier layer at a specified time. The acidic component in the back part (such as citric acid) will migrate toward the front part through the barrier layer. When the acidic component diffuses into the adhesive in the front part, the pH changes. When a certain pH is reached, the pH indicator changes color (or changes from colorless to a color).

Other variations of the same concept can be used. The pH indicator can be the migrating component and the acid media can be stationary. A basic component can be used instead of the acidic component provided the correct pH indicator is used.

Microporous Layer

A microporous layer can be used as a barrier layer. The microporous layer is impermeable to the colorant. Upon activation of the indicator, the migration modifier will travel into the porous (either by migration or capillary action) and fill or partially fill the porous (tunnels). The porous layer needs to be a network structure that allows material to travel completely through the layer. Many types of porous films are commercially available with different types of porous structures. The porous can be pretreated (coated, filled or lined) with additional materials to assist in the breaching mechanism. After the barrier is breached, any of the color change mechanisms can be used. Some examples as discussed earlier are: change in opacity, migration of a dye, migration of a pH indicator, or migration of a reducing agent.

Micro-encapsulation Barrier

A micro-encapsulated substance is essentially a coating or layer that protects the internal substance. This layer holds the material within, in a manner similar to a barrier layer, as discussed above. A colorant or co-colorant can be encapsulated and incorporated into a layer of some type. A migration modifier can be used in any barrier change mechanism as discussed above. The migration modifier would change the properties of the encapsulated layer (barrier layer) by any of the various means and release the colorant (or co-colorant). The color change process would then take place. The color change mechanism can be any of the previous methods as discussed above.

Having thus described the invention in detail, it is to be understood that the foregoing description is not intended to limit the spirit and scope thereof. What is desired to be protected by Letters Patent is set forth in the appended claims.

What is claimed is:

1. A time indicator comprising:

a back part including a base substrate with a migrating colorant on a first surface;

a colorant impermeable barrier layer overlaying the migrating colorant to prevent the migration of the colorant therthrough; and a front part including a substrate with a migration modifier on a first surface, such modifier for modifying the colorant permeability of the barrier;

wherein, when the back part and the front part are put into contact, the migration modifier coacts with the barrier layer without substantially coacting with the colorant to change the barrier layer to a colorant permeable layer to permit the colorant to migrate through the layer to cause a change that is visually perceptible through the front part.

2. The indicator of claim 1 wherein the colorant comprises a colored dye.

3. The indicator of claim 1 wherein the migration modifier comprises an adhesive.

4. The indicator of claim 3 wherein the visually perceptible change is a color change.

5. The indicator of claim 4 wherein the visually perceptible change additionally includes alphanumeric information.

6. The indicator of claim 1 wherein the barrier layer is opaque to conceal the colorant until the barrier is changed to a colorant permeable layer.

7. The indicator of claim 1 wherein the colorant is a migrating dye.

8. The indicator of claim 1 wherein the colorant is a pH indicator.

9. The indicator of claim 1 wherein the colorant is a leuco dye.

10. The indicator of claim 1 wherein the colorant is a dye intermediate.

11. The indicator of claim 1 wherein the colorant is a reactive dye.

12. The indicator of claim 1 wherein the colorant is a color changing agent.

13. The indicator of claim 1 wherein the colorant is a color former.

14. The indicator of claim 1 wherein the adhesive includes a plasticizer for modifying the barrier.

15. The indicator of claim 1 wherein the colorant is deposited on the base substrate in the form of a pattern of dots.

16. The indicator of claim 15 wherein the pattern of dots is in the form of alphanumeric information.

17. The indicator of claim 1 wherein the front substrate is clear.

18. The indicator of claim 1 wherein the front substrate is opaque.

* * * * *